United States Patent [19]

Veith

[11] Patent Number: 4,464,996
[45] Date of Patent: Aug. 14, 1984

[54] CONVEYOR APPARATUS

[75] Inventor: Gustav G. Veith, Laiming, Fed. Rep. of Germany

[73] Assignee: Gustav Georg Veith GmbH & Co., KG, Frasdorf, Fed. Rep. of Germany

[21] Appl. No.: 356,762

[22] Filed: Mar. 10, 1982

[30] Foreign Application Priority Data

Mar. 19, 1981 [DE] Fed. Rep. of Germany ....... 3110833

[51] Int. Cl.$^3$ ............................................ B61B 10/02
[52] U.S. Cl. .................................. 104/172 S; 104/93; 104/95; 105/154
[58] Field of Search ........... 104/89, 96, 172 R, 172 B, 104/172 BT, 172 S, 93, 95; 105/73, 148, 154; 198/473, 685, 687

[56] References Cited

U.S. PATENT DOCUMENTS

| 292,483 | 1/1884 | Graham et al. ................. 104/172 B |
| 1,095,965 | 5/1914 | Glazier ............................ 104/172 B |
| 2,479,680 | 8/1949 | Hamilton ............................. 198/687 |
| 2,934,200 | 4/1960 | Fletcher et al. ................ 198/687 X |
| 3,051,096 | 8/1962 | Walsh et al. ...................... 104/96 X |

FOREIGN PATENT DOCUMENTS

| 2344533 | 3/1975 | Fed. Rep. of Germany ... 104/172 S |
| 706349 | 3/1954 | United Kingdom ................ 198/687 |
| 899403 | 1/1982 | U.S.S.R. ........................... 104/172 B |

Primary Examiner—Randolph Reese
Attorney, Agent, or Firm—James E. Nilles

[57] ABSTRACT

The invention relates to a conveyor apparatus, particularly for intra-plant conveyance, comprising a conveyor rail system and a plurality of carrier units straddling the rail from below and resting thereon through rollers for travelling along at least one inclined conveyor stretch with the aid of a driven endless conveyor chain. On approaching the conveyor chain, coupling members on the carrier units come into engagement with the chain links. The invention improves the engagement of the coupling members to ensure reliable conveyance of the carrier units even after extended periods of operation of the conveyor apparatus. A tilting member is mounted between the arms of the carrier unit and is provided with projections at a mutual spacing adapted to the pitch of the chain in such a manner that as one of the projections enters a chain opening, so as to engage a chain link portion with its engagement face, a second projection has its bearing face engaged by a chain link portion between adjacent chain openings.

5 Claims, 6 Drawing Figures

CONVEYOR APPARATUS

BACKGROUND OF THE INVENTION

This invention relates to conveyor apparatus comprising a plurality of carrier units that are supported on a rail which guides them for movement, and a driven endless chain having a straight stretch which is parallel and adjacent to a straight section of the rail and to which each carrier unit is drivingly coupled as it moves along that section of the rail.

In a known conveyor apparatus of this type, as described in DE-PS No. 2,344,533, an inclined conveying stretch is provided with a driven endless roller chain having a working portion extending below the conveyor rail, and a return portion guided at a certain distance above the conveyor rail, the latter being formed with a guide edge for the working portion of the chain. Each carrier unit is provided with a coupling member in the form of a resilient crossbar extending tranversely of the travelling direction. Adjacent the inclined conveyor stretch the crossbar contacts the roller chain and comes into clamping engagement with a chain link. This engagement is brought about by proper selection of the spacings between the crossbar and the carrier rollers on the one hand, and between the conveyor rail and the working portion of the chain on the other. In order to achieve reliable engagement, the upper side of the known crossbar is cambered to conform to the shape of the roller chain link.

Even so, however, the engagement between the clamping elements and the roller chain amounts to no more than about 1.5 mm. It has been found that in the course of time the chain guide edge of the conveyor rail is flattened down, resulting in a considerable play between the clamping elements and the chain, so that, particularly when rather heavy goods are to be conveyed, the engagement depth between the chain and the coupling elements is no longer sufficient to ensure reliable conveyance.

SUMMARY OF THE INVENTION

It is an object of the present invention to improve a conveyor apparatus of the type set forth in the introduction by simple means and in such a manner that a reliable advance of the carrier units along inclined conveyor stretches is ensured.

The invention attains this object by providing each carrier unit with a tiltable coupling member having a pair of tooth-like protuberances or projections, spaced to opposite sides of the tilting axis of the member. As soon as a carrier unit arrives at the path of the conveyor chain, one of the projections enters a chain opening in such a manner that an engagement face on the projection is engaged by a chain link portion so as to entrain the carrier unit. This engagement is of a greater depth than in the case of the above discussed clamping element, so that the conveyance of the carrier unit is effectively ensured. Moreover, the engagement is positively ensured by the spacing between the projections, as the other projection is prevented from entering a chain opening, and instead it engages another chain link portion with a bearing face on it that faces generally towards the chain. This causes the coupling member to be tilted, whereby the first-named projection is retained in the engaged position. If the conveyor chain is a roller chain, the spacing between the projections is so selected that one projection enters a chain opening with its engaging face engaging a transverse link portion, while the bearing face of the other projection engages another transverse link portion. In the case of an elliptic link chain having adjacent links disposed at an angle of 90° to one another, the chain pitch is defined as the combined length of two adjacent links. In this case the projections of the coupling member are spaced in such a manner that one projection enters a horizontal link, while the other has its bearing face engaged by an upright link. With both types of chains it is of no importance whether the engaging projection is the leading one or the trailing one in the direction of travel, as the coupling effect is the same in both cases. The first projection to encounter a chain opening as the carrier unit approaches the chain enters thereinto. Along the inclined conveyor stretch, the carrier unit tends to assume a substantially vertical position due to the load suspended therefrom, whereby the carrier unit is tilted with respect to its coupling member, so that the projection is additionally biased into engagement with the respective chain opening. The invention offers the further advantage that a reliable engagement of the coupling member is still ensured even if there is an increased play between the coupling member and the guide edge due to deformation of the latter.

Further details and advantages will become evident from the following descriptions of embodiments of the conveyor apparatus according to the invention with reference to the accompanying drawings, wherein:

FIG. 1 shows a diagrammatic side view of a section of a conveyor apparatus including an inclined stretch, FIG. 2 shows a carrier unit as seen in the direction of travel, FIG. 3 shows a sectional view taken along the line III—III in FIG. 2, FIG. 4 shows an alternative embodiment of a tilting member, FIG. 5 shows the tilting member together with a chain section, and FIG. 6 shows the tilting member cooperating with a section of a different chain.

DESCRIPTION OF THE PREFERRED EMBODIMENT

Figure 1:
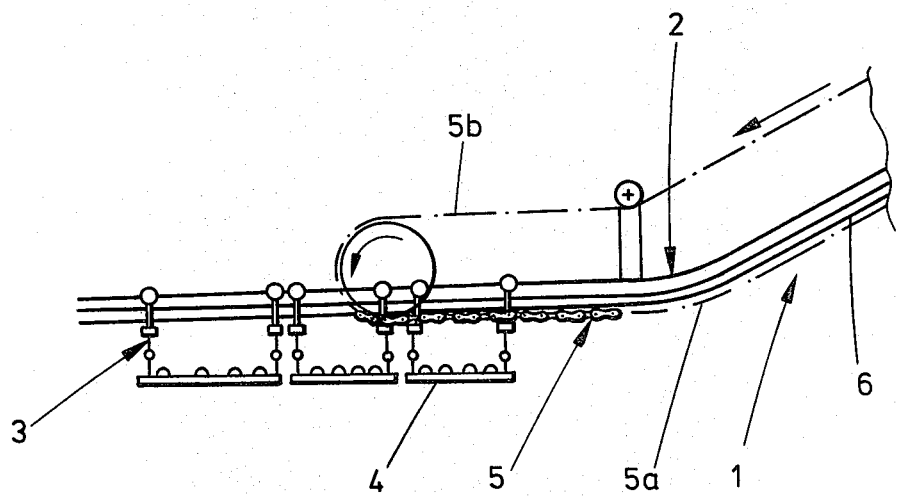

FIG. 1 shows a section of a conveyor system including an inclined conveyor stretch 1. A conveyor rail 2 extends over the entire length of the conveyor section shown. Adapted to travel along rail 2 are a number of carrier units 3 carrying suspended loads 4. A conveyor chain 5, shown as an endless roller chain extending along the conveyor section shown includes a working portion 5a extending below rail 2 and a return portion 5b extending at a certain level above rail 2. Along the length of chain 5, rail 2 is provided with a guide profile 6 for the working portion 5a.

Each carrier unit 3 has a pair of arms 7 straddling rail 2 from below and connected at their lower portions by a bolt-and-nut assembly 8. Bolt shaft 8a serves as a mounting for a suspension link 9 from which load 4 may be suspended as by means of a threaded eye link 10 as shown.

Adjacent its free end each arm 7 carries a roller 11. The two rollers 11 on the substantially V-shaped diverging arm portions are in angular alignment relative to one another and rest on inclined upper surfaces of rail 2. Rail 2 and guide profile 6 are shown in diagrammatic cross-section in FIG. 2.

At the portion of carrier unit 3 below rail 2, near the junction of the two arms 7, there is provided a pivot axis 12 for a tilting member 13. Pivot axis 12 and its attachment to carrier unit 3 substantially corresponds to the configuration of the bolt-and-nut assembly 8.

Figure 2:
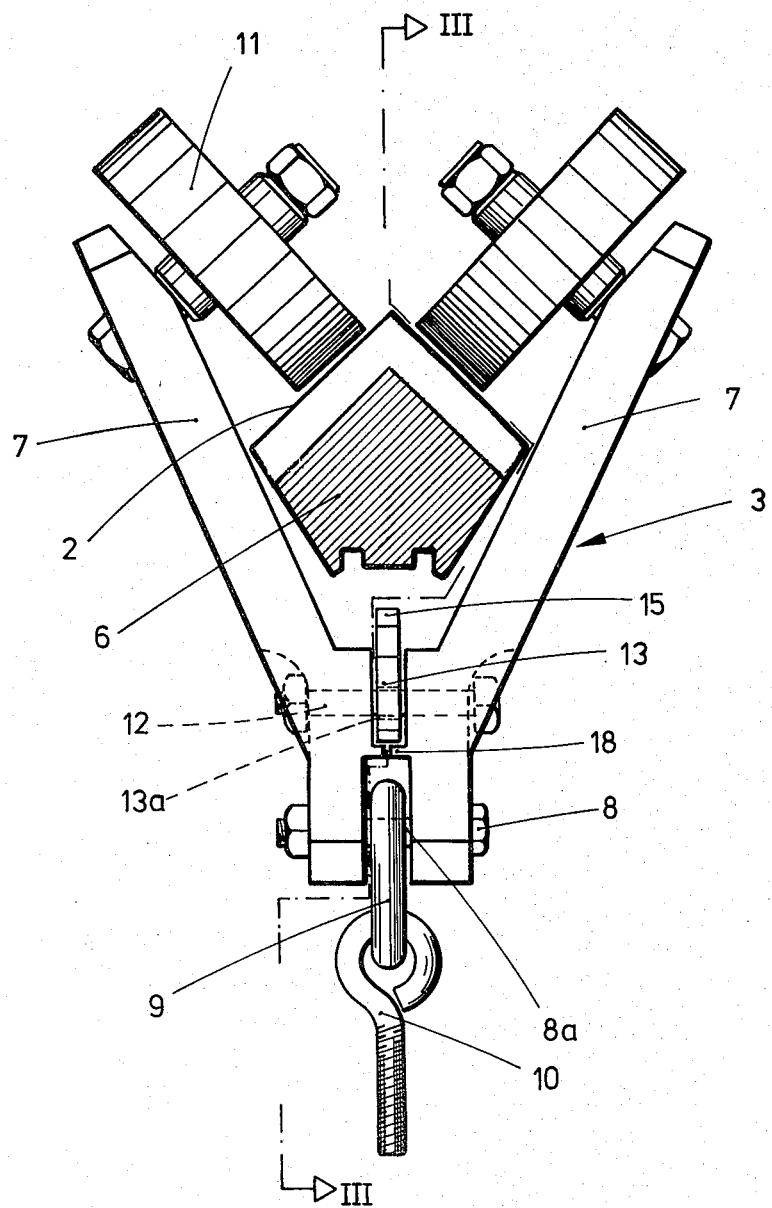
Figure 3:
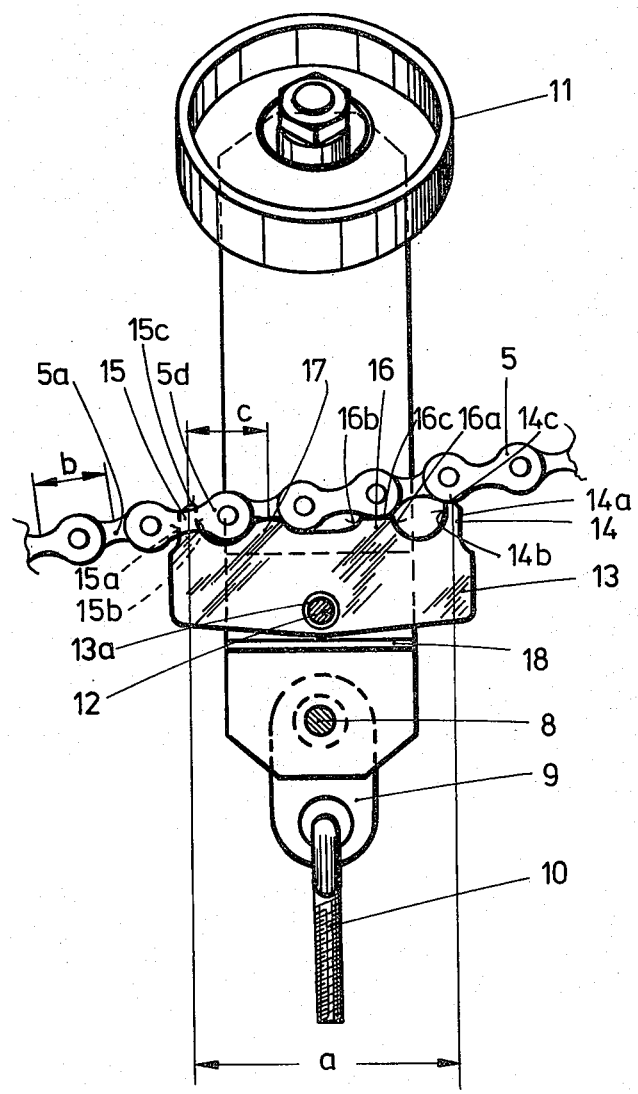

Tilting member 13 is essentially formed as an elongated plate member of a plastics material. Its profile is shown in FIG. 3, wherein the lefthand arm 7 of FIG. 2 is omitted. Tilting member 13 is mounted on pivot axis 12 by means of a bore 13a formed therein at its longitudinal center adjacent one longitudinal edge. The opposite longitudinal edge of tilting member 13, farther away from bore 13a, and which in the operative position of carrier unit 3 faces towards rail 2, is formed with a pair of outer projections in the form of teeth 14 and 15, and a pair of inner teeth 16 and 17. The inner teeth 16 and 17 are shorter than the outer teeth and are blunt, while the outer teeth are formed with acute tips. Each of the outer teeth 14 and 15 is formed with a convex outer flank 14a, 15a, respectively, and a concave inner flank 14b, 15b, respectively, acting as engagement faces. Due to the shape of the flanks, tips 14c and 15c are slightly inclined towards one another so as to form bearing faces. For the sake of simplicity, the respective flanks and tips are shown in FIG. 3 only for tooth 14.

The spacing a between outer teeth 14 and 15 equals an integral multiple of the pitch b of roller chain 5 plus one-half of the pitch, b/2. Thus in the example shown in FIG. 3, a equals three and a half times b. The spacing c between each outer tooth 14, 15 and the adjacent inner tooth 16 or 17, respectively, equals the chain pitch b. The inner teeth 16 and 17 are likewise formed with flanks 16a, 16b and 17a, 17b, respectively, acting as engagement faces, and with blunt ends 16c, 17c, respectively, acting as bearing faces. The respective designations are set forth in FIG. 3 only for tooth 16 for the sake of simplicity.

Also shown in FIG. 3 is the cooperation of roller chain 5 with tilting member 13. As the carrier unit 3 in question travelling along rail 2 approaches the working portion 5a of roller chain 5, one of the outer teeth, in the example shown tooth 15, enters one of the chain openings 5c, so that its engagement face 15b is transversely engaged by a transverse chain link portion 5d, chain 5 being prevented from retracting by the presence of guide profile 6 of rail 2 (not shown in FIG. 3). Pivotal movement of tilting member 13 is limited by stops 18 formed on arms 7. The inner tooth 17 adjacent to the engaged tooth 15 also enters a chain opening, although to a lesser depth. Due to the dimensional relationship explained above, the two remaining teeth 14 and 16 are prevented from engaging the chain, instead of which their bearing faces bear on the underside of transverse link portions 5d. This results in member 13 being slightly tilted relative to the mean direction of the chain, whereby teeth 15 and 17 are prevented from dropping out of their respective chain openings. This interaction between the teeth of the tilting member occurs irrespective of whether the leading or the trailing teeth are brought into engagement with the chain as the latter is approached by the carrier unit. On release of the carrier unit from the working portion of the chain at the reversing point thereof, the teeth are consecutively released from their driving and bearing engagement from the leading to the trailing end, thus restoring the movability of the tilting member, so that the release occurs without the danger of gripping.

Figure 4:
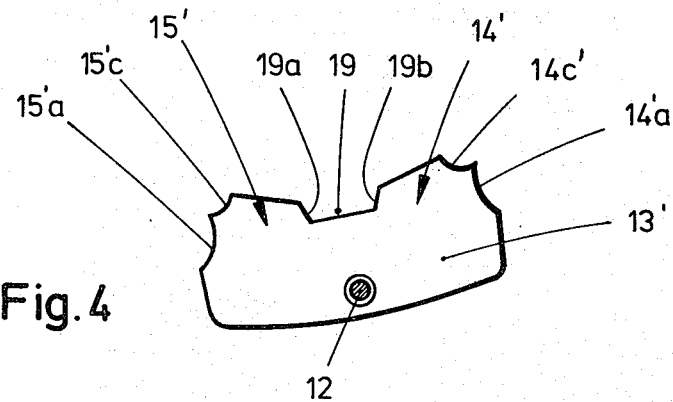
Figure 5:
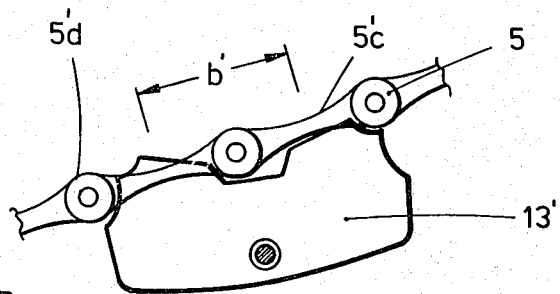
Figure 6:
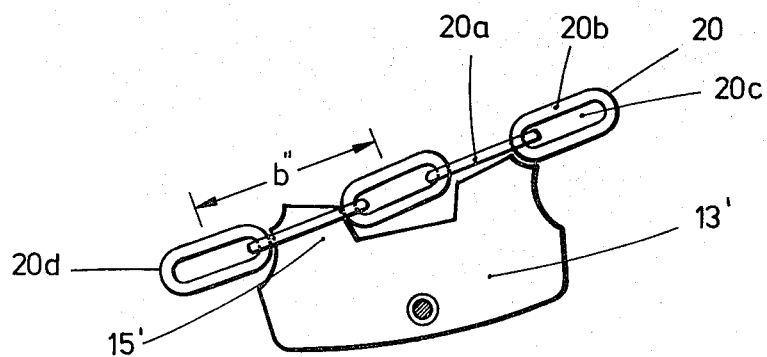

FIGS. 4 to 6 show an alternative embodiment of tilting member 13'. In operation, tilting member 13' is mounted on carrier unit 3 in the same manner as tilting member 13 shown in FIG. 3. FIG. 4 shows tilting member 13' alone on its pivot axis 12. Its projections 14' and 15' are of considerably greater width than teeth 14 and 15 of tilting member 13. The outwards facing flanks of projections 14', 15' are formed as concave engagement faces 14'a and 15'a, respectively, extending from the respective short edge of tilting member 13'. Inwardly adjacent the engagement faces each projection 14', 15' is formed with an upwards facing concave bearing face 14c', 15'c, respectively. Between projections 14' and 15', tilting member 13' is formed with a recess 19 defined by a pair of bearing faces 19a, 19b.

FIGS. 5 and 6 show the cooperation of tilting member 13' with two different conveyor chains. The chain shown in FIG. 5 is a roller chain 5' having a larger pitch b', however, than the chain shown in FIG. 3. With respect to this chain pitch b' the tilting member 13' is so dimensioned that one of its projections, such as the one designated 15', may enter a chain opening 5'c so that its engagement face 15'a is engaged by a transverse link portion 5'd, while at the same time the bearing face 14c' of the other projection 14' engages a transverse link portion 5'd from below. In addition, the lateral edge 19a of recess 19 comes into engagement with a transverse link portion 5'd.

In FIG. 6 tilting member 13' cooperates with an elliptic link chain 20, the pitch of which is defined as the distance between two chain links of the same alignment with respect to the plane of movement. As shown in FIG. 6, the dimensions of tilting member 13' are such that one projection, for instance the one designated 15', enters the opening 20c of a horizontal chain link 20a so that its engagement face 15'a is engaged by the transverse portion 20d of an upright chain link 20b, as is the lateral edge 19a of recess 19, while the bearing face 14c' of projection 14' engages the longitudinal portion of an upright chain link 20b from below. The conveyance of the carrier units occurs in the same manner as explained with reference to FIG. 3 by cooperation of tilting member 13' with the elliptic link chain 20.

The invention is not restricted to the embodiments described. Details of the carrier units and the mounting of the tilting members may be varied in several ways. The same applies to the material and the dimensions of the tilting member as long as the dimensional relationship of the projections with their engagement faces and bearing places and the pitch of the cooperating chain is maintained. This applies also to the employ of other chain types with correspondingly shaped projections on the tilting member.

I claim:

1. In conveyor apparatus comprising a plurality of carrier units, a rail on which said carrier units are supported for movement and along which they are guided, and a driven endless chain having a straight stretch parallel and adjacent to a straight section of said rail, said chain having at least certain links that are substantially identical and each of which has a transverse opening therethrough and has a laterally extending driving portion at one end of said opening, the driving portions of those links being spaced along the chain at uniform pitch distances, coupling means on each carrier unit for drivingly connecting it with said straight stretch of the chain, said coupling means comprising:

A. an elongated tiltable member having a pair of protuberances which project in one direction transverse to the length of the tiltable member,
(1) each of said protuberances having thereon
    (a) a bearing surface which faces substantially in said one direction and
    (b) a pair of other surfaces
        (i) which face in opposite directions lengthwise of the tiltable member and
        (ii) which are so spaced apart that the protuberance is receivable in said opening in one of said links with one of said other surfaces drivingly engaging the driving portion of that link, and
(2) said protuberances being spaced apart by a distance so related to said pitch distances that when one of said protuberances is received in said opening in one of said links, the bearing surface on the other protuberance is engaged against the driving portion of another of said links; and
B. a pivotal connection between said tiltable member and the carrier unit whereby said tiltable member is confined to rocking relative to the carrier unit about an axis
(1) which is midway between said protuberances and
(2) which extends transversely to the length of the tiltable member and to said one direction, said pivotal connection so disposing the tiltable member on the carrier unit that when the latter is on said straight section of the rail, said protuberances are engaged as aforesaid with links of said straight stretch of the chain.

2. The conveyor apparatus of claim 1 wherein said protuberances are in mirror-image symmetry to a plane which contains said axis and which is normal to the length of the tiltable member.

3. The conveyor apparatus of claim 1 wherein said tiltable member is plate-like, with opposite surfaces normal to said axis.

4. The conveyor apparatus of claim 3, further characterized by:
(1) said tiltable member having a longitudinal edge which is opposite said protuberances and faces substantially oppositely to said one direction; and
(2) the carrier unit having abutment surfaces thereon which face substantially in said one direction and which are engaged by end portions of said longitudinal edge to limit rocking of the tiltable member relative to the carrier unit.

5. The conveyor apparatus of claim 1 wherein said driving portion of each of said links has a substantially convex driving surface that faces towards said opening and wherein said one of said other surfaces of each protuberance is substantially concave to mate with said convex surface.

* * * * *